Dec. 2, 1924.
A. McL. NICOLSON
1,517,575
STEERING MEANS AND METHOD
Filed Dec. 30, 1921
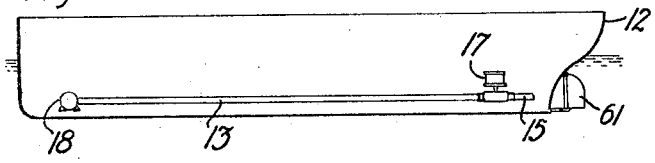
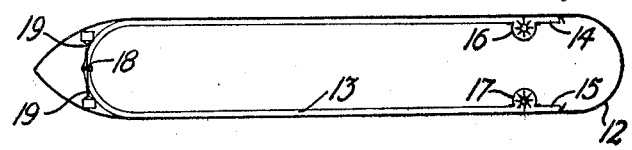
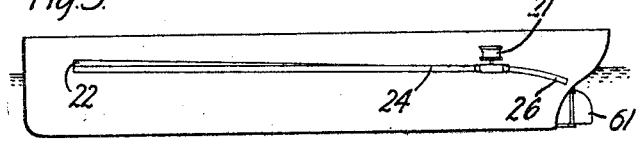
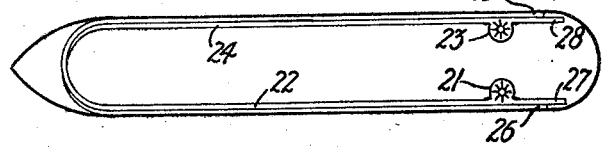
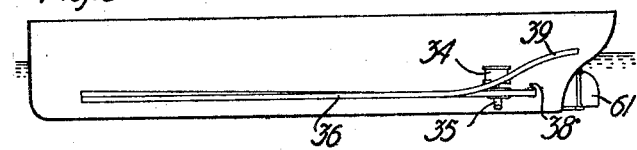
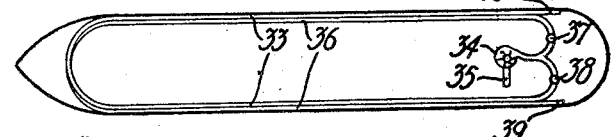
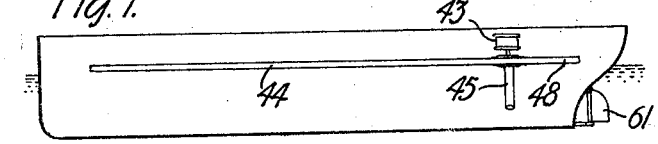
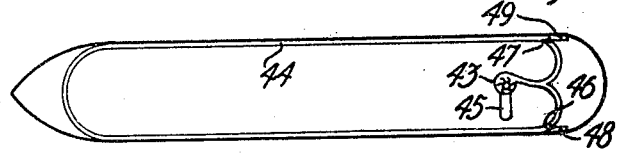
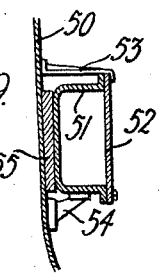
Inventor:
Alexander McLean Nicolson Patented Dec. 2, 1924.

1,517,575

UNITED STATES PATENT OFFICE.

ALEXANDER McLEAN NICOLSON, OF HILLSDALE, NEW JERSEY.

STEERING MEANS AND METHOD.

Application filed December 30, 1921. Serial No. 525,830.

*To all whom it may concern:*

Be it known that I, ALEXANDER McLEAN NICOLSON, a subject of the King of Great Britain, residing at Hillsdale, county of Bergen, State of New Jersey, have invented certain new and useful Improvements in Steering Means and Methods, of which the following is a full, clear, concise, and exact description.

This invention relates to means and methods for steering or turning vessels.

An object of this invention is to turn a vessel under all conditions of headway or rest in such a manner as to ordinarily render unnecessary the need of a rudder or other usual steering means. A further object is to provide a means and method for turning a vessel rapidly through any desired angle under emergency conditions when the vessel would not be readily responsive to the helm. Other objects of this invention will be apparent from the detailed description hereinafter given.

In accordance with the preferred form of this invention these objects are accomplished by surrounding the inner or outer hull of the vessel with a pipe or conduit through which a column of water is whirled by some suitable means such as accelerating centrifugal pumps. Whenever steering is desired the water or other fluid used is whirled through the pipe in a direction opposite to that in which it is desired to turn the vessel so that the reaction on the ship due to the acceleration of the water will produce the proper change in direction. Whenever the ship has turned through the desired angle the pumps may be stopped until such a time as an additional change in the direction of the vessel is desired. It will be apparent that this method of steering by accelerating a fluid contained in a pipe or channel disposed about the center of mass of the vessel is independent of the linear velocity of the vessel through the surrounding medium and therefore can be employed even when the vessel is at rest.

This invention will be better understood by reference to the following detailed description taken in connection with the accompanying drawing in which Fig. 1 represents this invention embodied in a vessel in which the channel race as well as its inlet and outlet are located below the level of the water; Fig. 2 is a plan view of the same; Fig. 3 is a modification of Fig. 1 in which the channel race is approximately at the level of the water while the inlet and outlet are below sea level; Fig. 4 is a plan view of Fig. 3; Fig. 5 is a modification of Fig. 1 in which the channel race and the inlet are below sea level while the outlet is above sea level; Fig. 6 is a plan view of Fig. 5; Fig. 7 shows a channel race fed by an intake beneath the ship and through which the sea water may be forced in either direction by a single pump; Fig. 8 is a plan view of Fig. 7; and Fig. 9 is a cross sectional view of the channel race showing one way it may be connected to the side of the vessel.

Referring now in detail to Figs. 1 and 2, a vessel 12 is shown therein in which is provided a channel or conduit 13 which may or may not completely surround an axis passing through the center of the vessel. In these figures however the channel 13 does not form a closed figure but is open at the rear end of the vessel. The pipes 14 and 15 serve as both inlets or outlets at times depending upon the direction it is desired to send the water through the channel. 16, 17, and 18 are suitable pumps, paddle wheels or screw impellers which may be employed to draw water from the sea and force it through the channel 13 in such a direction and acceleration that the desired turning of the vessel is produced. Devices 16 and 17 are shown as paddle wheels, or centrifugal pumps, while device 18 is shown as a screw impeller the shaft 19 for which projects through the wall of the channel race and is driven by some suitable means.

Suppose for example that it is desired to turn vessel 12 in a counter clockwise direction. Devices 16, 17, and 18 will then be energized in such a manner that the water is taken in by pipe 15, accelerated through the channel 13 and discharged through pipe 14. The acceleration of the water in a clockwise direction will produce an equal and opposite reaction on the ship causing the ship to turn in a counter clockwise direction. As soon as the desired turning has been accomplished the water will be allowed to flow out of channel 13 so that the weight of the water used in steering the vessel need not be carried by the vessel except at the times that a change in direction is desired.

If steering in a clockwise direction is desired pipe 14 should be used as the intake and the pipe 15 as the outlet, devices 16, 17, and 18 being speeded up to produce the desired reaction on the vessel.

Pipes 14 and 15 should of course be provided with suitable check valves to prevent the sea water from running in except when such is desired. The form and control of these valves however are immaterial and therefore will not be described in detail.

Figs. 3 and 4 illustrate a ship having a plurality of channel races the major portion of each being at or slightly above sea level but sloping in such a direction that their intakes and outlets are just below the level of the sea. The pump 21 may be employed for forcing water through channel 22 in a clockwise direction employing pipe 27 as an intake and pipe 29 as an outlet, or with the pump reversed the water may be sent in a counter clockwise direction using pipe 29 as an intake. Similarly pumps 23 may be employed for accelerating water through channel 24 in either a counter clockwise or clockwise direction using pipes 26 and 28 as intake and outlet or vice versa.

It is apparent that channel race 22 may be employed for steering in one direction while channel 24 may be employed for steering in the opposite direction, or they may be used simultaneously for steering in a desired direction.

Figs. 5 and 6 illustrate a ship having a double channel race 33, 36. A single reversible pump 34 may be employed for forcing the water in either direction, using pipe 35 as an intake. If for example steering in a clockwise direction is desired valve 37 is opened and valve 38 is closed so that the water is accelerated through channel 36 and outlet pipe 39. If on the other hand steering is desired in a counter clockwise direction pump 34 is started, valve 37 closed and valve 38 opened so that the water traverses channel 33 to outlet pipe 40. In this embodiment of the invention the double channel race is below the level of the water with the outlet pipes above the water level, while the intake is beneath the vessel to one side of the center line of the vessel.

Figs. 7 and 8 illustrate how a single pumping means 43 and a single channel race 44 may be employed for steering in either direction. The intake for pump 43 is by means of a pipe 45 beneath the ship. If steering in a clockwise direction is desired valve 46 is closed and valve 47 opened. The water is then forced through channel 44 in a counter clockwise direction and is discharged through pipe 48. If however steering in a counter clockwise direction is desired valve 47 is closed and valve 46 opened so that the water flows through channel 44 in a counter clockwise direction and out pipe 49.

Fig. 9 illustrates one way the channel race may be attached to the hull when the channel race is located within the outer hull. 50 is the hull of the vessel to which the channel race comprising members 51 and 52 is suitably fastened by supports 53 and 54. If desired cushioning material 55 such as wood or fibre may be inserted to prevent the centrifugal action of the water from injuring the hull. It is to be understood of course that the channel may be round in cross section as well as rectangular and may have any desired shape.

From the above description it may be seen that the main feature of this invention is to surround the vessel by a pipe through which a column of water is whirled by accelerating centrifugal pumps. In order to reduce the ship's running mass the water used during steering may be pumped into the pipe system and back into the sea.

It is to be understood of course that the intakes and outlets of the various arrangements may be provided with suitably controlled check valves for preventing the entrance of the sea water except when desired.

As it is desirable that the weight of the steering means should be a minimum, less than one per cent for example of the mass of the vessel, the centrifugal pumps and the water race should be designed to insure turning the ship in unit time through the angle called for by the average emergency, before reaching the maximum safe velocities for the pumps and the accelerated water. The reactive turning moment or torque of the moving mass of water on the ship is the product of the moment of inertia of the mass of water ($mr^2$) and the angular velocity, $a$. The mass of water, $m$, is the amount of water admitted and accelerated within the ship to a given maximum velocity, $v$, along a channel whose average radius of gyration, $r$, is greater than that of the ship about its center of mass. This is because the mass of the ship is uniformly distributed throughout its volume, if not mostly concentrated about its center, while the mass of the hydraulic system herein described is practically peripheral with respect to that of the ship.

In the above expression for torque the mass factor, $m$, refers to the quantity of accelerated water actually within the vessel at any instant and is a factor of the rate at which the ship may be turned. But the amount of water withdrawn from and returned to the sea is unlimited so that the ship may be turned indefinitely, either under headway or at rest.

In computing the time to turn a ship through any angle against the resistance of its surrounding medium, recourse is had to the principle of the conservation of angular momentum,—that is the angular momentum developed within the ship must equal the angular momentum impressed on the ship causing it to turn. This may be expressed as (1) $mr^2a = mvr = MR^2A$ Where $m$ is the mass of the water column; $r$, the radius of gyration of $m$; $a$, the angular velocity of the column of water and $v$ its maximum allowable velocity; M, the virtual mass of the ship in the sea; R and A, the ship's radius of gyration and angular velocity. This means that the water is accelerated from zero velocity to this maximum safe velocity, during which time its inertia is given up to the ship, and then expelled from the ship at this velocity $v$.

Now since the time it required to turn the ship through 360 degrees may be expressed as (2) $t = \dfrac{2\pi}{A}$ substituting the value of A from equation (1) we have (3) $t = \dfrac{2\pi MR^2}{mvr}$ Now since $2\pi$, $M/m$, $v$, and $\dfrac{R}{r}$ are all constants, it follows that (4) $t = KR$ where K is a constant.

In other words a ship may, for example, at rest be turned through an angle of 180 degrees in a period measured in seconds corresponding in numerical value with its radius of gyration in feet.

Since the speed of operation of the centrifugal pump is limited to the safe speed of its rotor and the steam turbine driving it, the pumping capacity should be great enough to force the water through the channel race at a higher speed than exists within the pump. This is brought about by creating greater pump volume per unit distance and pressure than exists in the channel where the water is accordingly compelled to flow faster and consequently the water is accelerated to a greater degree.

When the water has accelerated to a maximum velocity at which the period of emergency is intended to be past then further turning will be due only to the external reaction of the water at intake and outlet and the sea. Ordinarily the reaching of this point in the turning of the vessel should be without significance as the vessel will continue to turn at a modified rate by the reaction as aforesaid. At this point if desired to reduce water friction and non-functioning mass of water, a short path between the pump and outlet might conveniently be provided. Otherwise the whole operation could be rendered intermittent by admitting air to the pump and channel behind the water, moving now at maximum velocity or feeding the pump into a spare channel race used alternately with the first one. For example in Fig. 4 channel 22 could be used until maximum velocity of the water is reached and then channel 24 could be used until the water in channel 22 had approximately zero velocity whereupon the water in channel 22 could be speeded up again.

In order to cause an increased rate of turning as in an emergency condition the channel could previously be connected by piping directly with the ship's boilers and filled with steam by blowing out the air. When sudden turning is desired the proper stop valve and water intake would be opened while the outlet would be only closed by the check valve (usually kept closed by the sea head of water). The water would then rush into the channel and acquire a greater momentum than if the pumps alone were in operation. The sea-check valve at the outlet would of course open to the sea and release the accelerated water and cause maximum turning of the vessel.

It is to be understood of course that the steering arrangements above described may be employed in other types of vessels, such as submarines, airplanes, and the like. The steering arrangement will be especially useful in warfare for turning warships to direct the fire, or to avoid torpedoes. In peace times it will also be extremely useful in entering or leaving harbors for example where the vessel is not readily responsive to the ordinary rudder which can be used to turn the vessel only when the vessel is under headway.

This invention is therefore useful as co-operating with the ordinary rudder such as shown as 61 in the drawings. It is to be understood of course that a ship can be steered by means of this invention entirely without the use of the ordinary rudder, although it may be desirable at times to employ the rudder particularly when the ship is under considerable headway.

This invention of course is not limited to the use of water since other fluids may be used. For example in airplanes it may be desirable to use gasoline which however is not discharged but is constantly circulated through a circular channel as long as a change in direction is desired.

The word vessel as used in the appended claims is intended to cover ships which float on the water,—submarines, hydroplanes, balloons, airplanes, and the like.

It is to be understood of course that this invention is not limited to the particular forms described above, but that they may be variously modified without departing in anywise from the spirit of this invention as defined in the appended claims. For example the steering may be accomplished by employing a gas, such as air, instead of a liquid such as water.

What is claimed is:

1. The method of steering a vessel which comprises injecting a fluid in said vessel and circulating said fluid about said vessel at an accelerated rate.

2. The method of steering a vessel which comprises forcing a liquid along a curved path at an accelerated rate to produce a desired reaction on said vessel.

3. In combination, a vessel, and means for steering said vessel, comprising pumping means within said vessel, an intake for said pumping means, a curved channel, and connections including valves for forcing a liquid into said channel in either direction from said pumping means.

4. In combination, a vessel, and means for steering said vessel comprising a curved channel mounted adjacent a side of said vessel, means for forcing a liquid through said channel at a high velocity and cushioning means between said channel and the side of said vessel.

5. The method of internally steering a vessel which comprises circulating a fluid around said vessel at an accelerated rate.

6. The combination with a vessel of means for steering said vessel, comprising a curved channel describing a substantially circumferentially complete path around the center of said vessel, and means for forcing a fluid through said channel at an accelerated rate.

7. In combination a vessel, and means for changing the direction of said vessel comprising a channel curved around the center of said vessel in a substantially circumferentially complete path, and means for accelerating a liquid in either direction along said channel.

In witness whereof, I hereunto subscribe my name this 28th day of December, A. D. 1921.

ALEXANDER McLEAN NICOLSON.